United States Patent

Chino et al.

[11] Patent Number: 5,304,254
[45] Date of Patent: Apr. 19, 1994

[54] METHOD OF REMOVING DUST FROM A WEB INVOLVING NON-CONTACT SCRAPING AND BLOWING

[75] Inventors: Naoyoshi Chino; Yasuhito Hiraki; Hiromu Ueha; Tsunehiko Sato, all of Kanagawa, Japan

[73] Assignee: Fuji Photo Film Co., Ltd., Kanagawa, Japan

[21] Appl. No.: 735,667

[22] Filed: Jul. 26, 1991

Related U.S. Application Data

[63] Continuation of Ser. No. 358,767, May 30, 1989, abandoned.

[30] Foreign Application Priority Data

May 30, 1988 [JP] Japan .................. 63-130209

[51] Int. Cl.⁵ .................. B08B 7/04; B08B 1/02
[52] U.S. Cl. .................. 134/37; 134/15; 134/21; 134/9; 15/306.1; 15/316.1; 15/308; 15/345
[58] Field of Search .................. 134/15, 21, 37, 9; 15/306 A, 316 R, 308, 302, 345

[56] References Cited

U.S. PATENT DOCUMENTS

| | | | |
|---|---|---|---|
| 2,899,339 | 8/1959 | Rakus | 134/21 |
| 3,574,261 | 4/1971 | Bailey et al. | 34/23 |
| 4,010,514 | 3/1977 | Fischer et al. | 15/306 A |
| 4,491,485 | 1/1985 | Sanderson | 134/9 |
| 4,611,553 | 9/1986 | Iwata | 15/302 |
| 4,691,450 | 9/1987 | Glaser et al. | 15/306 A |
| 4,905,500 | 3/1990 | Mason | 15/345 |

Primary Examiner—Theodore Morris
Assistant Examiner—Thomas G. Dunn, Jr.
Attorney, Agent, or Firm—Sughrue, Mion, Zinn, Macpeak & Seas

[57] ABSTRACT

A method for removing dirt from a web in which a blow-off nozzle is provided extending over the width of a web. An edge of the nozzle at an end thereof is positioned close to one surface of the web. Air is blown through the nozzle while said web is being run past said nozzle so that deposits are removed from a surface of the web with the edge while the web is maintained in a floating state separated from the nozzle.

5 Claims, 1 Drawing Sheet

METHOD OF REMOVING DUST FROM A WEB INVOLVING NON-CONTACT SCRAPING AND BLOWING

This is a continuation of application Ser. No. 07/358,767 filed May 20, 1989, now abandoned.

BACKGROUND OF THE INVENTION

The present invention relates to a method for removing dust or other matter from a web, namely, a flexible support made of paper, plastic or the like. More particularly, the invention relates to a method for removing dust or the like from a web which is moving.

A variety of methods for removing dust from a running web have been proposed in the art. In one of these, termed a dry-type dust removing method, unwoven cloth or a brush held suitably is pushed against a web to remove deposits from the surface of the web. (See, for example Japanese Unexamined Published Patent Applications Nos. 136764/1986 and 27309/1987 and Japanese Patent Applications Nos. 42741/1986, 7329/1987 and 94740/1987.) In another method, a stream of air high in purity is applied at high speed to a web running over a backup roll to remove deposits from the surface of the web by passing them past a suction port. In still another method, the surface of a web is polished directly with a hard member made of diamond or sapphire. (See Japanese Unexamined Patent Applications Nos. 92130/1987, 172532/1987 and 243553/1986, and Japanese Patent Application No. 132991/1987.) Moreover, there are known wet-type dust removing methods in which a web is introduced into a cleaning solution tank where deposits are removed from the web by ultrasonic vibration, or a cleaning solution such as water or organic solvent is applied to a web and deposits together with the cleaning agent are removed from the web by doctoring. (See Japanese Unexamined Patent Applications Nos. 150571/1984, 60748/1987 and 296826/1985.)

However, the above-described conventional methods have various problems. In the method of removing dust from a web using unwoven cloth or a brush, or in a method of polishing the surface of a web with a hard member of diamond or sapphire, the physical contact forms scratches on the web and generates static electricity. In addition, in the method using unwoven cloth, fibers of the unwoven cloth may stick to the surface of the web.

The method of applying a stream of air to a web at high speed is effective in removing deposits which are relatively large in diameter (more than several tens of microns); however, it is substantially not effective in removing deposits which are small in diameter or high in adhesion.

In the wet-type dust removing methods, it is impossible to completely scrape the cleaning solution off the surface of the web, and accordingly it is necessary to provide a drying zone, with the result that the cost of equipment is increased as much, and the cleaning solution is increased in cost. Also, because of the provision of the drying zone, the distance the web travels is increased as much, as a result of which foreign matter such as dust may stick to the web. Furthermore, the cleaning solution functions as a lubricant during the doctoring, and therefore foreign matter strongly stuck to the web may not be removed.

SUMMARY OF THE INVENTION

Accordingly, an object of this invention is to eliminate the above-described difficulties accompanying a conventional method for removing dust from a web. More specifically, an object of the invention is to provide a method for removing dust from a web in which no physical contact is made with the surface of a web to remove therefrom deposits small in diameter or deposits firmly stuck to the web.

The foregoing object of the invention has been achieved by the provision of a method for removing dirt from a web in which, according to the invention, a blow-off nozzle extending is over the width of a web and having an edge at the end thereof is set close to one surface of the web which is being run, so that deposits are removed from the surface of the web with the edge while the web is held in a floating state.

The term "web" as used herein is intended to mean flexible belt-shaped materials several centimeters to several meters in width, more than several tens of meters in length and several microns to several hundreds of microns in thickness, such as plastic films which are made of polyethylene terephthalate, polyethylene-2, 6-naphthalate, cellulose diacetate, cellulose triacetate, cellulose acetate propionate, polyvinyl chloride, polyvinylidene chloride, polycarbonate, polyimide, or polyamide; sheets of paper on which $\alpha$-polyolefins two to ten in the number of carbons such as polyethylene, polypropylene, and ethylene-butane copolymer are coated or applied in lamination form; metal foils such as aluminum, copper or tin foils; or belt-shaped materials prepared by forming a preliminary layer or layers on the above-described flexible belt-shaped supports. For instance, a photographic photosensitive coating solution, magnetic coating solution, surface protecting solution, charge preventing solution or smoothing solution is applied to the web according to the application at hand, and the web thus processed is cut to a predetermined size. Typical products are photographing films, photographic printing papers, and magnetic tapes.

DESCRIPTION OF THE PREFERRED EMBODIMENTS

A preferred embodiment of the invention will now be described with reference to the accompanying drawings.

Figure 1:
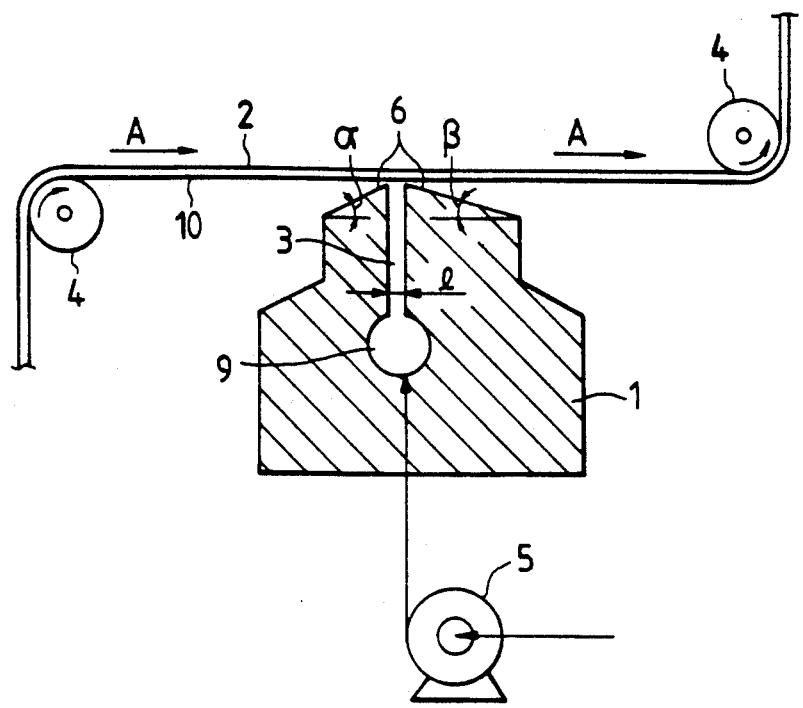
FIG. 1 is a sectional view showing an apparatus embodying the dust removing method of the invention.

FIG. 1 is a sectional view of an apparatus embodying the method of the invention.

As shown in FIG. 1, a web 2 is laid over a plurality of guide rollers 4 and run at a predetermined speed in a predetermined direction (in the direction of an arrow A in FIG. 1). A blow-off nozzle 1 is arranged between the guide rollers 4 in such a manner that it confronts the surface of the web 2 from which dust is to be removed. The blow-off nozzle 1 has a slit 3 which extends over the width of the web. The slit 3 has an edge 6 at its end portion.

The lower end portion of the slit 3 is formed into a chamber 9. The chamber 9 is connected to an air blower 5, so that a stream of air pressurized generally at about 0.01 to 5 kg/cm² is jetted out of the slit 3.

As a result, the stream of pressurized air forms a thin layer of air between the edge 6 and the web 2 running in the direction of the arrow A. Therefore, by suitably controlling the pressure, the web 2 can be run while being maintained a predetermined distance of the order of several microns (μm) between the web and the edge.

In this operation, deposits 10 stuck to the surface of the web are caught directly by the edge 6 of the blow-off nozzle 1, and therefore even foreign matter strongly stuck to the web can be positively removed. The small deposits are scattered off the web by the pressurized air stream.

If the edge is made of cemented carbide or ceramic, then foreign matter firmly stuck to the web can be more effectively scraped off.

As is apparent from the above description, in the deposit removing operation, the surface of the web 2 is kept away from the edge 6, and accordingly no scratches nor static electricity is produced on the surface of the web 2.

The above-described arrangement may be modified by covering the blow-off nozzle 1 with a scattering preventing casing so that foreign matter once removed from the web will not again be allowed to stick to the web. The configuration of the nozzle 1 is not limited to that described above; that is, it may be freely designed under the condition that the nozzle can remove deposits from the web while maintaining it in a floating state.

As described above, in the method for removing dust from a web according to the invention, the blow-off nozzle extending over the width of a web and having an edge at the end is set close to one surface of the web so that deposits are removed from the web while the latter is held in a floating state. Therefore, according to the invention, no physical contact is made with the surface of the web to remove foreign matter which of small diameter or foreign matter which is strongly stuck to the web.

Accordingly, no scratches are formed on the surface of the web. Thus, the method for the invention is high in efficiency and low in cost.

As conducive to a full understanding of the invention, specific examples thereof and a comparison example will be described.

Example of the Invention No 1

A blow-off nozzle manufactured according to FIG. 1 was used to remove foreign matter from webs, and it was detected whether or not the surfaces of the webs were scratched. In the manufacture of the blow-off nozzle, the edge protruding toward the web was designed so that the angle α of the surface forming one part of the edge, which was on the upstream side in the direction of conveyance of the web, was 5°, and the angle forming the opposite part of the edge, which was on the downstream side, was 4.5°.

The angles α and β were formed between the respective surfaces and the plane perpendicular to the slit. The edge was made of cemented carbide. The following results were observed.

TABLE 1

| Specimen No. | Air pressure (kg/cm²) | Web speed (m/min) | Scratches On Web |
|---|---|---|---|
| 1 | 0.01 | 100 | None |
| 2 | 0.05 | 100 | None |

TABLE 1-continued

| Specimen No. | Air pressure (kg/cm²) | Web speed (m/min) | Scratches On Web |
|---|---|---|---|
| 3 | 0.1 | 100 | None |
| 4 | 0.5 | 100 | None |
| 5 | 1 | 100 | None |
| 6 | 2 | 100 | None |
| 7 | 4 | 100 | None |
| 8 | 0.01 | 300 | None |
| 9 | 0.05 | 300 | None |
| 10 | 0.1 | 300 | None |
| 11 | 0.5 | 300 | None |
| 12 | 1 | 300 | None |
| 13 | 2 | 300 | None |
| 14 | 4 | 300 | None |

The webs used were polyethylene terephthalate web 15 μm in thickness and 500 mm in width.

As is apparent from Table 1, no scratches were found on the surfaces of the webs which were processed under the dust removing conditions listed in Table 1.

Example of the Invention No. 2

Figure 2:
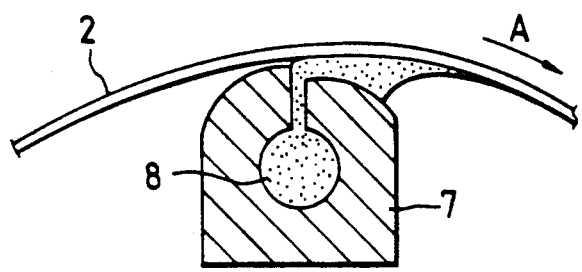
FIG. 2 is a sectional view showing a part of a magnetic-coating-solution applying device for webs.

The surfaces of webs were subjected to dust removal under the dust removing conditions described above (Specimens Nos. 4, 5, 11, 12 and 14). A coating device 7 as shown in FIG. 2 (Japanese Patent Application No. 94657/1984) was used to coat the webs thus processed with a magnetic coating solution 8 as indicated in the following Table 2 to an after-drying thickness of 3 μm. The amount of foreign matter caught by the edge of the coating device 7 and the number of stripes formed by the foreign matter thus caught, were visually detected.

The magnetic coating solution 8 was prepared by sufficiently mixing and dispersing the compounds listed in Table 2 in a ball mill, and 30 parts by weight epoxy resin (the equivalent amount of epoxy being 500) was added to the mixture and uniformly mixed and dispersed.

TABLE 2

| | |
|---|---|
| γ-Fe₂O₃ powder (needle-shaped particles 0.5 μm in average larger diameter, and 320 Oe in coercive force) | 300 parts by weight |
| Vinyl chloride-vinyl acetatecopolymer (co-polymerization ratio 87:13, copolymerization degree 40) | 30 parts by weight |
| Electrically conductive carbon | 20 parts by weight |
| Polyamide (amine value 300) | 15 parts by weight |
| Lecithin | 6 parts by weight |
| Silicon oil (dimethyl siloxane) | 3 parts by weight |
| Xylole | 300 parts by weight |
| Methyl isobutyl ketone | 300 parts by weight |
| n-butanone | 100 parts by weight |

COMPARISON EXAMPLE

A magnetic coating solution was applied to the webs (Specimens Nos. 15 and 16) under the same coating conditions as in Example 2 which had not been subjected to dust removal, and the amount of foreign matter caught by the edge of the coating device 7 and the number of stripes formed on the webs by the foreign matter thus caught were visually detected. The results of the visual detection are as indicated in the following Table 3:

TABLE 3

| Specimen No. | Web Coating Speed (m/min) | No. Foreign Particles | No. of Stripes On Web |
|---|---|---|---|
| 4 | 100 | 0 | 0 |
| 5 | 100 | 0 | 0 |

TABLE 3-continued

| Specimen No. | Web Coating Speed (m/min) | No. Foreign Particles | No. of Stripes On Web |
|---|---|---|---|
| 11 | 300 | 0 | 0 |
| 12 | 300 | 0 | 0 |
| 14 | 300 | 0 | 0 |
| 15 | 100 | 15 | 12 |
| 16 | 300 | 23 | 20 |

(Note) In each of the above-described experiments, the data were obtained from a roll of web having a coating length of 3000 m. Specimens Nos. 4, 5, 11, 12 and 14 were examples of the invention and Specimens Nos. 15 and 16 were comparative examples.

As is apparent from Table 3, in the comparison examples, foreign matter stuck to the surface of the web was caught by the edge of the coating head, thus forming stripes on the surface of the web. On the other hand, in the examples according to the invention, foreign matter having been removed from the surface of the web in advance, no foreign matter was caught by the edge of the coating head, and accordingly no stripes were formed on the surface of the web; that is, the web was satisfactorily coated with the magnetic coating solution.

We claim:

1. A method for removing dirt from a web, comprising the steps of:

providing a blow-off nozzle having a slit extending over the width of a web; setting an edge of said nozzle at an end thereof close to one surface of said web, said web being maintained separated from said edge by a distance of about several microns; and blowing air through said nozzle while said web is being moved past said nozzle at a predetermined speed so that deposits which are relatively large in size with respect to said distance are removed from a surface of said web with said edge while said web is maintained in a floating, non-contacting state separated from said nozzle;

wherein, in said step of blowing air through said nozzle, a pressure of a stream of air produced by said nozzle is in a range of 0.01 to 5 kg/cm$^2$; and further wherein an angle $\alpha$, which is formed between a surface forming a part of said edge on an upstream side in a direction of conveyance of said web and a plane perpendicular to said slit, is 5°; and an angle $\beta$, which is formed between a surface forming an opposite part of said edge on a downstream side thereof and said plane, is 4.5°.

2. The method of claim 1, wherein said predetermined speed is in a range of 100 m/min to 300 m/min.

3. The method of claim 1, wherein said pressure of said stream of air produced by said nozzle is 5 kg/cm$^2$.

4. The method of claim 1, wherein said edge is made of a cemented carbide material.

5. The method of claim 1, wherein said edge is made of a cemented ceramic material.

* * * * *